United States Patent
Petrecca

(10) Patent No.: US 6,409,593 B1
(45) Date of Patent: Jun. 25, 2002

(54) DRAWING FOR WINNERS OVER THE INTERNET

(76) Inventor: Anthony Petrecca, 142 Washington Ave., Fort Lee, NJ (US) 07024

(*) Notice: Subject to any disclaimer, the term of this patent is extended or adjusted under 35 U.S.C. 154(b) by 0 days.

(21) Appl. No.: 09/624,634

(22) Filed: Jul. 24, 2000

(51) Int. Cl.7 .................................................. A63F 9/24
(52) U.S. Cl. ............................ 463/17; 273/269; 705/14
(58) Field of Search ............................... 463/16, 17, 18, 463/19, 20, 21, 22, 23, 24, 25, 26, 27, 28, 29, 30, 31, 40, 41, 42; 273/138.1, 138.2, 139, 224, 269; 705/14; 700/91, 92, 93; 235/375–386

(56) References Cited

U.S. PATENT DOCUMENTS

| | | | | |
|---|---|---|---|---|
| 4,711,454 A | * | 12/1987 | Small | |
| 4,815,741 A | * | 3/1989 | Small | |
| 4,982,346 A | * | 1/1991 | Girouard et al. | |
| 4,993,714 A | * | 2/1991 | Golightly | |
| 5,007,641 A | * | 4/1991 | Seidman | |
| 5,362,051 A | * | 11/1994 | Swafford, Jr. et al. | |
| 5,588,649 A | * | 12/1996 | Blumberg et al. | |
| 5,772,511 A | * | 6/1998 | Smeltzer | |
| 5,791,990 A | * | 8/1998 | Schroeder et al. | 463/17 |
| 5,791,991 A | * | 8/1998 | Small | |
| 5,802,497 A | * | 9/1998 | Manasse | 705/27 |
| 5,855,369 A | * | 1/1999 | Lieberman | |
| 5,930,761 A | * | 7/1999 | O'Toole | 705/5 |
| 5,945,653 A | * | 8/1999 | Walker et al. | 235/380 |
| 6,011,835 A | * | 1/2000 | Rathore et al. | 379/93.13 |
| 6,016,338 A | * | 1/2000 | Bansal et al. | 379/93.13 |
| 6,024,288 A | * | 2/2000 | Gottlich et al. | 235/493 |
| 6,061,660 A | * | 5/2000 | Eggleston et al. | 705/14 |
| 6,146,272 A | * | 11/2000 | Walker et al. | |
| 6,173,267 B1 | * | 1/2001 | Cairns | 705/14 |
| 6,193,605 B1 | * | 2/2001 | Libby et al. | 463/17 |

OTHER PUBLICATIONS

Lottery Analyzers, http://www.softseek.com/Home_Family_and_Leisure/Lottery_Analyzers/.*
Mummert et al., An Internet Sweepstakes, Target Marketing, Aug. 1996.*

* cited by examiner

Primary Examiner—Michael O'Neill

(57) ABSTRACT

In a drawing for prizes conducted on the Internet, the clients (players) log onto the web page of the server (drawing web site). The player saves his/her paper receipts received, for example, incidental to the purchase of goods, and enters the date and time of each receipt into blank blocks on the drawing web site's web page. Winners are randomly selected based on the entered dates and times.

3 Claims, 2 Drawing Sheets

```
                                 12              10
                         FIRST BANK              
                                       11                    DRUG STORE ONE          20A
                         ATM - MAIN ST.                 20                     21
                                                             Store No. 173
                         Date    Time                                                 22
                                          14                 121 Main St. Armonk
             13          05/30/00    9:07               22A    10504                  25
                                                             Epsom Salt ...... $1.99
                         ATM No. 74154    15            24
                                                                  Tax .......  0.06   26
                         Account No. ending
             16          with 1688
                                                                - Total ..... $2.05
             18          Amount    $100.00              27
                                                             CASH ............ $10.00
                         Available Balance $1,745.00    28                            29
                                                             CHANGE .......... $7.95
                                                             DATE      TIME           31
                                                             05/30/00    9:08
                                                        30

FIG. 1A                              FIG. 1B

32A
                         GOOD EATS
                   32    121 Main St.
                         Armonk, NY 10504
                                                        34
                         Amex. 074329722
                   33
                         Check No. .... 743216          36
                   35
                             Amount .... $92.50
                             Tax .......  5.20          37
                             Tip .......  7.00          38A
                             Total ...$104.70           38B
                         DATE: 05/30/00

FIG. 1C
```

DRAWING FOR WINNERS OVER THE INTERNET

FIELD OF THE INVENTION

The present invention is related to the playing of a game of chance or sweepstake over the Internet, and more particularly to the random selection (drawing) of a winner among those who log onto a web site.

BACKGROUND OF THE INVENTION

At the present time there are many types of games of chance in which a winner is selected using a random process. For example, in a state-sponsored lottery or sweepstake a person buys a lottery ticket and selects a series of numbers, i.e., he selects 5 or 6 numbers with each number being from 1 to 50. A series of numbers is then derived by a random process, such as by dropping numbered ping-pong balls.

Various games of chance are shown in U.S. Pat. Nos. 6,024,641; 6,017,032; 5,938,200; 5,855,369; 5,791,991; 4,721,309; 4,689,742 and 4,494,197.

A "drawing" is a similar type of game, except the numbers are assigned to the players and not selected. For example, all the persons at a concert are told to hold on to their ticket stubs. The stubs are numbered. At the end of the concert a number is randomly selected and the person with the ticket stub holding that number wins a prize.

This general idea, of picking a winner at random, has been used by various Internet web sites in order to attract viewers. In one example, a web site, which is the "server", advertises that it will give cash prizes to winners, which are its "clients". The prize may be an award of $1000 each day. The person logs on to the web site to enter the contest. The web site derives revenue from selling advertisements which are displayed to viewers who log on to its site. The winners, presumably, are selected by some random process.

This type of game is a "drawing", as distinct from a "lottery", since the user does not purchase a ticket. In general a lottery, in which the user pays to enter the game, may be illegal in various states of the United States of America and in some foreign countries. In New York State, the Penal Law Section 225 defines "Gambling" as when "A person . . . stakes or risks something of value upon the outcome of a contest or chance or a future continent event . . ."

Those Internet drawings, in which the users log on and obtain a chance of winning, without paying to enter, may not be "gambling" and may therefore be legal.

Also, at the present time, persons who purchase goods and services, such as restaurant meals, gasoline, grocery items, clothing, movie theater tickets, etc., generally receive a receipt for their purchase. Such receipts are almost always given when the items are purchased using a credit card. The receipt generally has the date and very often has the time (hour and minute) that the receipt is printed. Many receipts also display the ZIP (postal) code of the establishment. Some people save such receipts for their records, but many others throw them away. In addition, other types of paper documents are printed with a time and date, including parking tickets, ATM receipts, and bank deposit receipts.

SUMMARY OF THE INVENTION

In accordance with the present invention, a system and method is provided in which customer receipts may be used in a legal prize-awarding drawing on the Internet.

In this invention, a user (client computer or "client") will log onto a special web site of a server computer ("server") devoted to the drawing, called herein "drawing site" or "web drawing site".

The drawing site will display a page having blank spaces which are to be filled in by the user. These blank spaces call for the identification of a user's receipt by its date, time and ZIP code. The term "receipt" means any paper slip having a time and date, including parking tickets, ATM receipts, etc. The receipt may be for any purchase, from any vendor, and may be for any day, within a selected limit, i.e. the most recent 30 days.

This activity is generally legal since it does not require any purchase by, or money from, the users ("players"). It is not "gambling" since the player does not stake or risk anything of value. It is not a "lottery" since the players do not pay something of value for chances represented by numbers.

In some cases, receipts which are issued have a date, but not the time. In that case, preferably a time is assigned by the drawing web site based upon the exact time the user logs onto the site. Alternatively, the user may be asked to select a time. The drawing web site has a box (blank) to be filled in by the user with a ZIP (postal) code. Preferably it is the ZIP code shown on the receipt. If there is no ZIP code used on the receipt, the user may use his/her home or office ZIP code. If the user does not enter a ZIP code, or if the user is in a foreign country, the drawing web site automatically assigns a ZIP code (5-digit number) to the user. Since there are 1440 minutes a day and 10,080 minutes a week, the use of a 5-digit ZIP code (with about 74,000 U.S. ZIP codes) gives odds of 1 in about 746 million. To reduce the odds, the drawing web site can use only a few of the digits (initial or terminal) of the ZIP code.

When the user logs on to the drawing web site, for the first time, he/she is asked to enter either the user's e-mail address or the user's name and postal address, i.e. registration. The drawing web site retains a record of the user's URL and his/her return address (e-mail or name/postal address). The user need not enter that information again, because the drawing web site automatically receives and records the user's UAL each time the user logs on to that site.

At selected times the drawing web site selects one, or more, winners. Such selection may be made, for example, on a daily, weekly, monthly and/or yearly basis. Preferably, the client's receipt information and address ("entry information") is saved, so that the saved entry is automatically entered into the weekly and/or yearly drawing—even though it has lost a daily drawing.

The selection is made by a random process, i.e. a random number generator. The drawing web site knows the Internet address of the winners since it saves the incoming addresses of all users until the winners are selected.

The drawing web site obtains its revenue from selling advertising space on its web site. It does not collect a fee from the users, so it is not running a lottery or an illegal gambling enterprise.

BRIEF DESCRIPTION OF THE DRAWINGS

The following detailed description should be taken in conjunction with the accompanying drawings.

In the drawings:

FIGS. 1A, 1B and 1C show typical paper receipts; and

DETAILED DESCRIPTION OF THE INVENTION

I. The Internet

Figure 2:
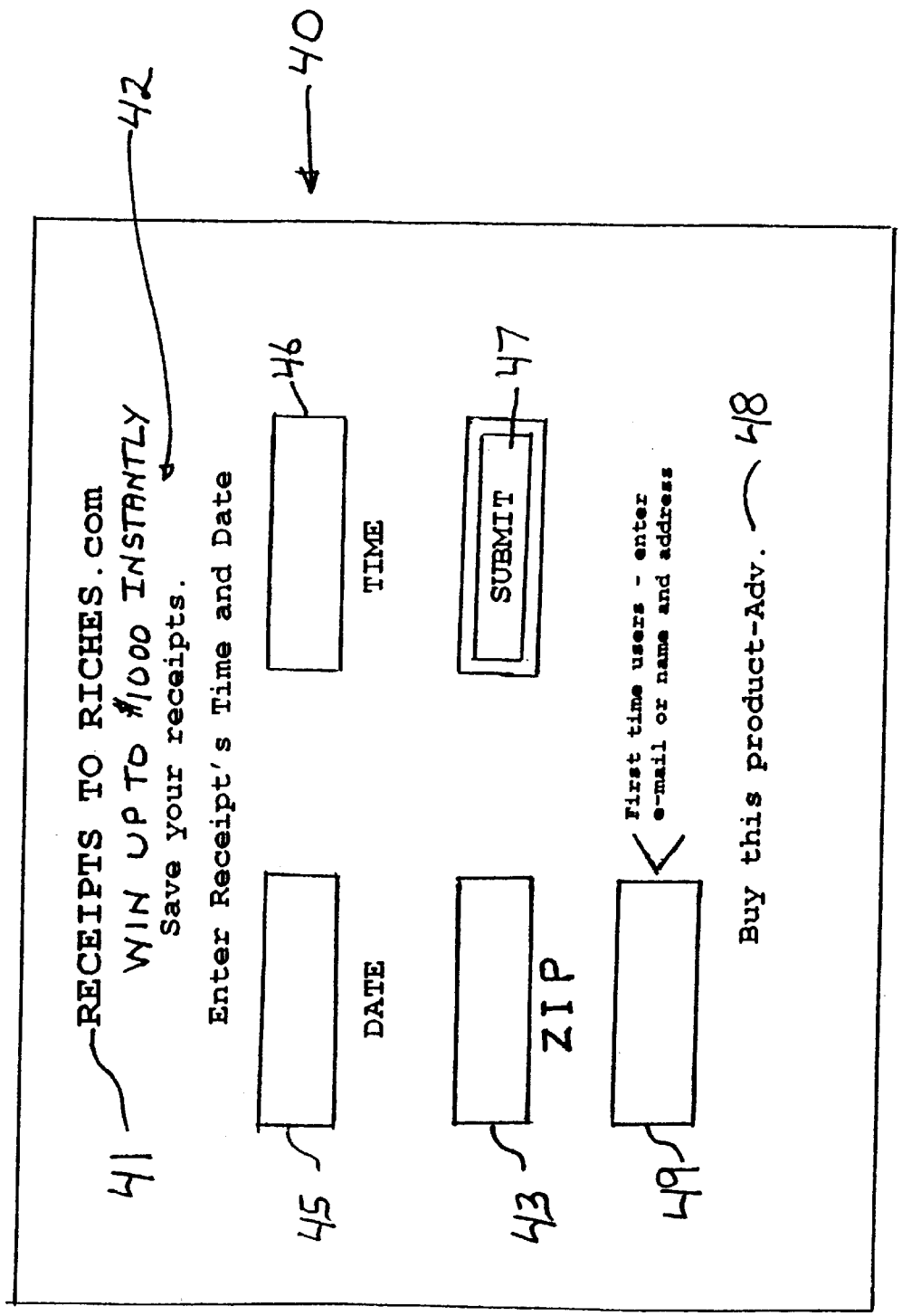
FIG. 2 shows an embodiment of the proposed drawing web site.

The following is a background description of the Internet.

The Internet is a system of geographically distributed remote networks interconnected by computers executing network protocols. Protocols allow users to interact and share information over the networks. A protocol is essentially a set of rules or standards designed to enable computers to connect with one another and to exchange information with as little error as possible. The Internet is an "open" system for which developers can design software for performing specialized operations or services, especially without restriction.

The Internet utilizes the TCP/IP software protocols ("Transport Control Protocol/Internet Protocol"). A protocol is a set of rules governing the format and meaning of messages ("packets") exchanged over networks. Each of the services available over the Internet is generally defined by its own networking protocol.

Electronic information transferred between networks is usually presented in hypertext format, a metaphor for presenting information in a manner in which text, images, sounds, and actions become linked together in a complex, non-sequential web of associations that permit the user to "browse" or "navigate" through related topics, regardless of the presented order of the topics. These links are often established by both the author of a hypertext document and by the user, depending on the intent of the hypertext document. The term "hypermedia" is nearly synonymous with "hypertext" but focuses on the nontextual components of hypertext, such as animation, recorded sound, and video. Hypermedia is the integration of graphics, sound, video, or any combination into a primarily associative system of information storage and retrieval.

The Internet follows a client-server architecture. In a client-server architecture, a client is usually a computer that accesses shared network resources provided by another computer (i.e., a server). Based upon user requests, the server presents filtered electronic information as server responses to the client process.

Client and server communicate with one another utilizing the functionality provided by Hypertext Transfer Protocol (HTTP). The World Wide Web (WWW) ("Web") includes all the servers adhering to this standard which are accessible to clients via a Universal Resource Loader (URL). Remote network services such as the World Wide Web are typically accessed by specifying a unique network address (i.e., Universal Resource Locator). Universal Resource Locators have two basic components: the protocol to be used and the object pathname. For example, the Universal Resource Locator address, "http://www.uspto.gov" (i.e., home page for the U.S. Patent and Trademark Office) specifies a hypertext transfer protocol ("HTTP") and a URL of the server (e.g., "www.uspto.gov"). The server name is associated with a unique numeric value (i.e., IP address).

Client and server are typically coupled to one another via TCP/IP connections for high-capacity communication. Active within the client is a first process, known as a "browser", which establishes the connection with the server and presents information to the user. The server itself executes corresponding server software which presents information to the client in the form of HTTP responses. The HTTP responses correspond to Web "pages" constructed from a Hypertext Markup Language (HTML), or other server-generated data. HTTP, in the context of the World Wide Web, is a protocol that provides file transfers for hypertext-based information among local and remote systems.

Client and server typically display browsers for utilization by a user via a graphical user interface, a type of display format that enables users to choose commands, start programs, and see lists of files and other options by pointing to pictorial representations (e.g. icons) and lists of menu items on the screen. Choices can generally be activated either with a keyboard or point device such as a mouse. A browser presents information to a user through a graphical user interface window by displaying images, graphics, or text within the window region. The user, in turn, communicates with the application by "pointing" at graphical objects in the window with a pointer controlled by a hand-operated pointed device or by typing words or numbers in blank spaces (input blocks) within the window.

II. Receipts and the Web Page

Typical receipts are shown in FIGS. 1A–1C.

The receipt 10 of FIG. 1A is from an ATM. It displays the name of the bank 12, the location 11 of the ATM terminal, the date 13, the time 14 (in hours and minutes), the ATM number 15, the card number 16, the serial number 17, the amount withdrawn 18, and the available balance 19.

The receipt 20 of FIG. 13 is from a drug store. It displays the name of the store 20A, the store number 21 and address 22, the store's ZIP code 22A, numbers representing the transaction 23, the item name 24, the item price 25, tax 26, total 27, cash 28, change 29, date 30 and time 31 (hour and minute). Some receipts show seconds, but the seconds are not entered. Some receipts are in 24-hour (military) time, but the drawing web site converts them to ordinary (a.m. and p.m.) time.

The receipt 34 is from a restaurant. It displays the restaurant name and address 32, the ZIP code 32A, the credit card type and number 33, the table 34, check number 35, amount 36, tax 37, tip 38A, total 38B. It displays a date 39—but not a time. In this case, since the receipt does not display a time, a time is assigned to the user by the drawing web page, preferably based on the time the user logs on to that site.

A preferred drawing web site page 40 is shown in FIG. 2. As shown, its heading is a domain name 41 of the applicant, which is "RECEIPT TO RICHES.com". Below that is an announcement 42 indicating that a user (player) has a chance to win a prize. That announcement says, "Win Up To $1000 Instantly. Save Your Receipts."

This illustrates an instant winner type of drawing in which a date and time are pre-selected on a random basis. For example, on June 25 the selection is made that the winner on June 26 will be 9:45 a.m. Anyone who logs on and fills in that time and date will be a winner. If the winning is $1000 and 4 persons are winners, they could each win $250. Preferably, the user (player) enters his/her ZIP code, or the ZIP code of the receipt, into a box 43. If the user does not enter a ZIP code into box 43, that entry is automatically assigned a ZIP code number, using a random number, by the drawing web site. The winner, among those with the same day and time, is the one whose ZIP code is selected, or comes closest, to a random selected number.

Alternatively, the winners may be selected each month for the prior month. This is not an instant winner situation.

The users (players) are requested to keep their receipts, since they will be required to mail in their original receipts in order to collect their winnings. Store owners, who have copies, but not originals, could not thereby wrongfully pretend to be winners by mailing in the copies.

As shown in FIG. 2, the user need only enter two pieces of information, namely, the date of the receipt in box 45 and the time in box 46. In addition, there may be a box 43 for the players ZIP code, as a way of choosing winners. In all cases the user will then operate the "submit" box 47.

In addition, first time users are requested to enter their e-mail, or their name and address, in box 49. This registers the user. The drawing web site records (in its computer memory) the user's URL and its associated registration information, i.e., e-mail address. The next time the user logs on, his/her URL will identify the user to the drawing web site.

As shown in FIG. 2, an advertisement 48 is displayed to the player. The drawing web site obtains its revenue from the sale of such advertising space.

What is claimed is:

1. A method of conducting a legal drawing sweepstake over the Internet in which:

(a) a plurality of players obtain a document, each of the documents displaying at least a time and a date;

(b) the players each log onto the Internet and communicate with a server drawing web site;

(c) the drawing web site displays a web page having a box indicating that it is to be filled in with a time and a date;

(d) the drawing web site displays said page also having a box to be filled in with a zip code from the document, when there is no zip code on the document, a zip code is automatically randomly assigned by the web site and said box is automatically filled in; and (e) the drawing web site randomly selects a time, a date and a portion or all of a zip code and awards a prize to a player whose time, date and zip code most closely matches the selected time, date and zip code.

2. A method of conducting a legal drawing sweepstake over the Internet in which:

(a) a plurality of players obtain a document, each of the documents displaying at least a date;

(b) the players each log onto the Internet and communicate with a server drawing web site;

(c) the drawing web site displays a web page having a box indicating that it is to be filled in with a date;

(d) the drawing web site displays said page also having a box to be filled in by the time on the document, when there is no time on the receipt, the log on time is automatically used;

(e) the drawing web site displays said page also having a box to be filled in with a zip code from the document, when there is no zip code on the document, a zip code is automatically randomly assigned by the web site; and (f) the drawing web site randomly selects a date, time and potion or all of a zip code and awards a prize to a player whose date and time and zip code most closely matches the selected date and time and zip code.

3. A method as in claim 1 or 2 wherein the document is selected from the group consisting of:

(a) retail store purchase receipts;

(b) restaurant receipts;

(c) credit card purchase receipts;

(d) gasoline purchase receipts;

(e) ATM slips;

(f) parking tickets;

(g) theater ticket stubs; and (h) paper slips of any type.

\* \* \* \* \*